(12) United States Patent
Kang et al.

(10) Patent No.: US 10,284,325 B2
(45) Date of Patent: May 7, 2019

(54) APPARATUS FOR OAM MODE COMBINATION AND ANTENNA APPARATUS FOR MULTI-MODE GENERATION

(71) Applicant: Electronics and Telecommunications Research Institute, Daejeon-si (KR)

(72) Inventors: Min Soo Kang, Daejeon-si (KR); Kwang Seon Kim, Sejong-si (KR); Myung Sun Song, Daejeon-si (KR); Woo Jin Byun, Daejeon-si (KR); Bong Su Kim, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 283 days.

(21) Appl. No.: 15/251,198

(22) Filed: Aug. 30, 2016

(65) Prior Publication Data
US 2017/0155467 A1    Jun. 1, 2017

(30) Foreign Application Priority Data

Nov. 27, 2015 (KR) .......................... 10-2015-0167976
May 12, 2016 (KR) .......................... 10-2016-0058399

(51) Int. Cl.
*H04J 14/04* (2006.01)
*H04J 14/06* (2006.01)
(Continued)

(52) U.S. Cl.
CPC ............... *H04J 14/06* (2013.01); *H01Q 5/55* (2015.01); *H01Q 9/0407* (2013.01); *H04B 10/116* (2013.01)

(58) Field of Classification Search
CPC .. H04J 14/02; H04J 14/04; H04J 14/06; H04J 14/0298; H04J 14/0282; H04B 10/5161;
(Continued)

(56) References Cited

U.S. PATENT DOCUMENTS 8,013,784 B2    9/2011 Margomenos et al.
2015/0138657 A1    5/2015 Byun et al.
(Continued)

FOREIGN PATENT DOCUMENTS

KR        10-0985048      10/2010
KR    10-2011-0051091      5/2011
WO        2012/084039      6/2012

*Primary Examiner* — Hanh Phan
(74) *Attorney, Agent, or Firm* — Kile Park Reed & Houtteman PLLC

(57) ABSTRACT

An apparatus for orbital angular momentum (OAM) mode combination and an antenna apparatus for multi-mode generation are provided. The apparatus for OAM mode combination includes three input ports configured to receive independent OAM mode signals, four output ports configured to output OAM mode signals with the same or different phase delays; and a circuit element configured to simultaneously combine or distribute the OAM mode signals by controlling phases of output signals output through the four output ports to be different depending on the OAM mode signals received through the input ports.

17 Claims, 5 Drawing Sheets

(51) Int. Cl.
*H01Q 9/04* (2006.01)
*H01Q 5/55* (2015.01)
*H04B 10/116* (2013.01)

(58) Field of Classification Search
CPC .............. H04B 10/516; H04B 10/2581; H04B 10/2575; H04L 27/2659; H04L 27/266; H04L 27/2634; H04L 5/0048; H01Q 19/191; H01Q 15/148
USPC ... 398/65, 152, 182, 183, 79, 158, 159, 115, 398/76, 45, 135, 136, 44, 43, 184, 185, 398/188
See application file for complete search history.

(56) References Cited

U.S. PATENT DOCUMENTS

| | | | |
|---|---|---|---|
| 2015/0146815 A1* | 5/2015 | Berretta | H04L 5/04 375/279 |
| 2015/0188660 A1* | 7/2015 | Byun | H04B 10/2581 398/44 |
| 2017/0012732 A1* | 1/2017 | Kowalevicz | H01Q 21/00 |

* cited by examiner

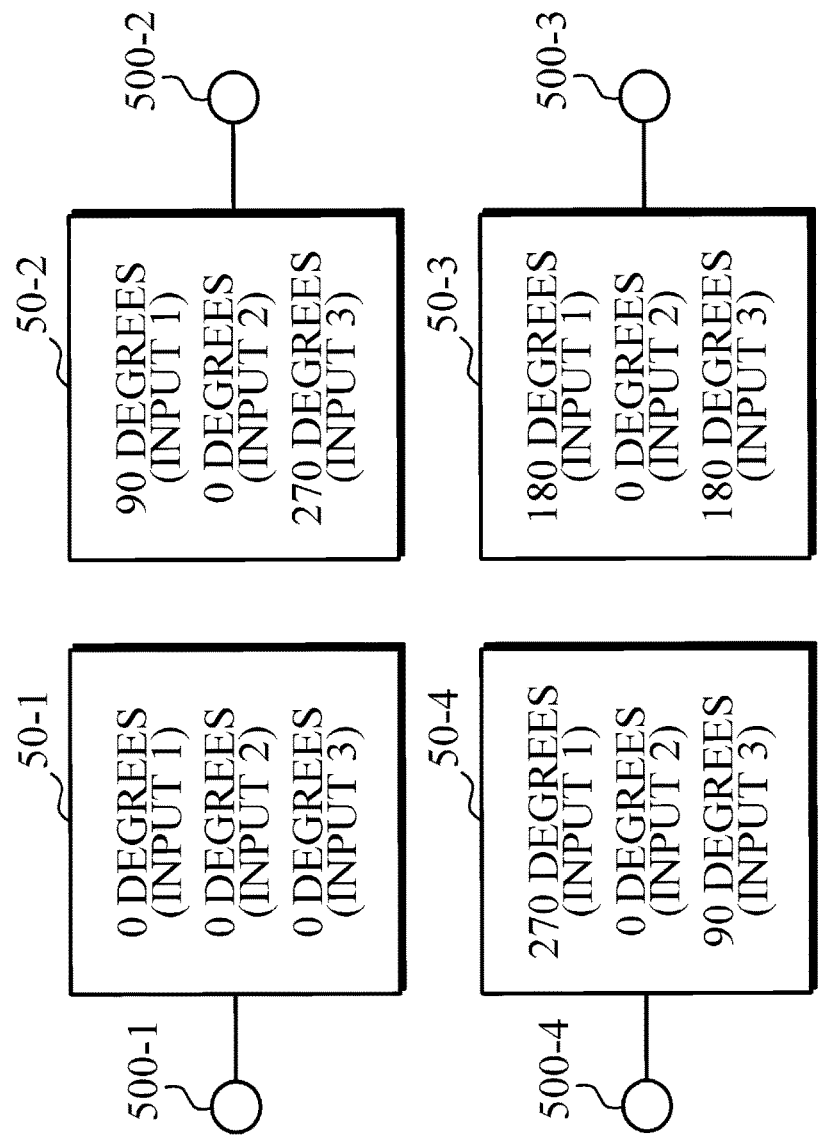

APPARATUS FOR OAM MODE COMBINATION AND ANTENNA APPARATUS FOR MULTI-MODE GENERATION

CROSS-REFERENCE TO RELATED APPLICATION(S)

This application claims priority from Korean Patent Application Nos. 10-2015-0167976, filed on Nov. 27, 2015 and 10-2016-0058399, filed on May 12, 2016, in the Korean Intellectual Property Office, the disclosure of which is incorporated herein by reference in its entirety.

BACKGROUND

1. Field

The following description relates to a frequency efficiency enhancement technology, and more particularly, to a communication technology based on an orbital angular momentum (OAM) mode.

2. Description of Related Art

In modern times, demands for services that transmit and receive a large amount of data such as video, voice, and the like at high speeds have rapidly increased. As a result, in order to increase data capacity of a high-speed point-to-point system in a line-of-sight (LOS) environment, research is being conducted on communication using an orbital angular momentum (OAM) phenomenon. The OAM mode communication is a communication scheme that uses an OAM phenomenon, which is a new physical quantity for distinguishing communication signals using mathematical orthogonality of an OAM mode even when the frequency, polarization, and multi-antenna array characteristics remain the same.

OAM was predicted by Poynting and thereafter introduced in an optical communication field, and thus active research is in progress. In particular, due to a very short wave length, visible light used in optical communication has good straight propagation and high energy concentration characteristics. Accordingly, in an LOS environment, the visible light may be useful in that high-quality lenses and beam splitters are easily manufactured. However, since it is difficult to generate a multi-mode through combination in a frequency band such as micro waves or millimeter waves with relatively long wavelengths, for commercial utilization, there is a need for components for multi-mode transmission.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an apparatus for orbital angular momentum (OAM) mode combination that can efficiently combine OAM modes, and an antenna apparatus for multi-mode generation.

In one general aspect, an apparatus for orbital angular momentum (OAM) mode combination includes three input ports configured to receive independent OAM mode signals, four output ports configured to output OAM mode signals with the same or different phase delays; and a circuit element configured to simultaneously combine or distribute the OAM mode signals by controlling phases of output signals output through the four output ports to be different depending on the OAM mode signals received through the input ports.

The circuit element may include an in-phase power combiner having two outputs with respect to one input, the two outputs having the same magnitude and the same phase; four 90° power combiners each having one isolated output and two signal outputs with respect to one input, the two signal output signals having the same magnitude and a phase difference of 90°; and a crossover having two isolated outputs and one signal output with respect to one input.

The in-phase power combiner may be an in-phase 3 dB power combiner, and the 90° power combiners may each be a 90° 3 dB power combiner.

The circuit element may include a first 90° power combiner configured to receive a first mode signal applied to a first input port and divide the first mode signal into two signals; a second 90° power combiner configured to receive one of the two signals generated by the first 90° power combiner, divide the received signal into two signals, and output the two signals through the first and second output ports; and a third 90° power combiner configured to, when the crossover receives the other of the two signals generated by the first 90° power combiner, receive a signal output through the crossover, divide the received signal into two signals, and output the two signals through the third and fourth output ports. The crossover may adjust a phase delay such that the output signals output through the output ports have the same magnitude and a phase delay of −90° therebetween with respect to the first output port.

The circuit element may include an in-phase power combiner configured to receive a second mode signal applied to the second input port and divide the second mode signal into two signals; a first 90° power combiner configured to receive one of the two signals generated by the in-phase power combiner and divide the received signal into two signals; a second 90° power combiner configured to receive one of the two signals generated by the first 90° power combiner, divide the received signal into two signals, and output the two signals through the first and second output ports; a third 90° power combiner configured to, when the crossover receives the other of the two signals generated by the first 90° power combiner, receive a signal output through the crossover, divide the received signal into two signals, and output the two signals through the third and fourth output ports; and a fourth 90° power combiner configured to receive the other of the two signals generated by the in-phase power combiner and divide the received signal into two signals.

When the crossover receives one of the two signals generated by the fourth 90° power combiner, the second 90° power combiner may receive a signal output through the crossover, divide the received signal into two signals, and output the two signals through the first and second output ports. The third 90° power combiner may receive the other of the two signals generated by the fourth 90° power combiner, divide the received signal into two signals, and output the two signals through the third and fourth output ports. The crossover may adjust a phase delay such that the output signals output through the output ports have the same magnitude and a phase delay of 0° therebetween with respect to the first output port.

The circuit element may include a fourth 90° power combiner configured to receive a third mode signal applied to a third input port and divide the third mode signal into two signals; a third 90° power combiner configured to receive one of the two signals generated by the fourth 90° power combiner, divide the received signal into two signals, and output the two signals through the third and fourth output ports; and a second 90° power combiner configured to, when the crossover receives the other of the two signals generated by the fourth 90° power combiner, receive a signal output through the crossover, divide the received signal into two signals, and output the two signals through the first and second output ports. The crossover may adjust a phase delay such that the output signals output through the output ports have the same magnitude and a phase delay of 90° therebetween with respect to the first output port.

In another general aspect, an antenna apparatus for multi-mode generation includes an antenna structure having a single antenna disposed at each output port of an orbital angular momentum (OAM) mode combining apparatus. The antenna structure is configured to receive, through antenna input ports, signals distributed by the OAM mode combining apparatus and output through the output ports and generate a multi-OAM-mode radiation due to the phase delays among the antenna input ports.

When OAM mode signals with phase delays of 0°, 90°, 180°, and 270° are applied to a first antenna input port, a second antenna input port, a third antenna input port, and a fourth antenna input port, the antenna structure may generate a multi-OAM-mode signal with a phase rotating clockwise in an electric field direction. When OAM mode signals with the same phase are applied to the antenna input ports, the antenna structure may generate a multi-OAM-mode signal with the same phase in an electric field direction. When OAM mode signals with phase delays of 0°, 270°, 180°, and 90° are applied to a first antenna input port, a second antenna input port, a third antenna input port, and a fourth antenna input port, the antenna structure may generate a multi-OAM-mode signal with a phase rotating counterclockwise in an electric field direction.

The antenna structure may be a planar patch antenna. The antenna structure may be a horn antenna.

The antenna apparatus may further include three input ports configured to receive independent OAM mode signals; four output ports configured to output OAM mode signals having the same or different phase delays; and a circuit element configured to simultaneously combine or distribute the OAM mode signals by controlling phases of output signals output through the four output ports to be different depending on the OAM mode signals received through the input ports, output the combined or distributed signals, and input the output signals to the antenna input ports.

Other features and aspects will be apparent from the following detailed description, the drawings, and the claims.

BRIEF DESCRIPTION OF THE DRAWINGS

FIG. 5 is a block diagram showing an antenna structure in which a single antenna is disposed at an output port of the OAM mode combining apparatus of FIG. 1 to generate a multi-OAM-mode radiation pattern according to an embodiment of the present disclosure.

Figure 1:
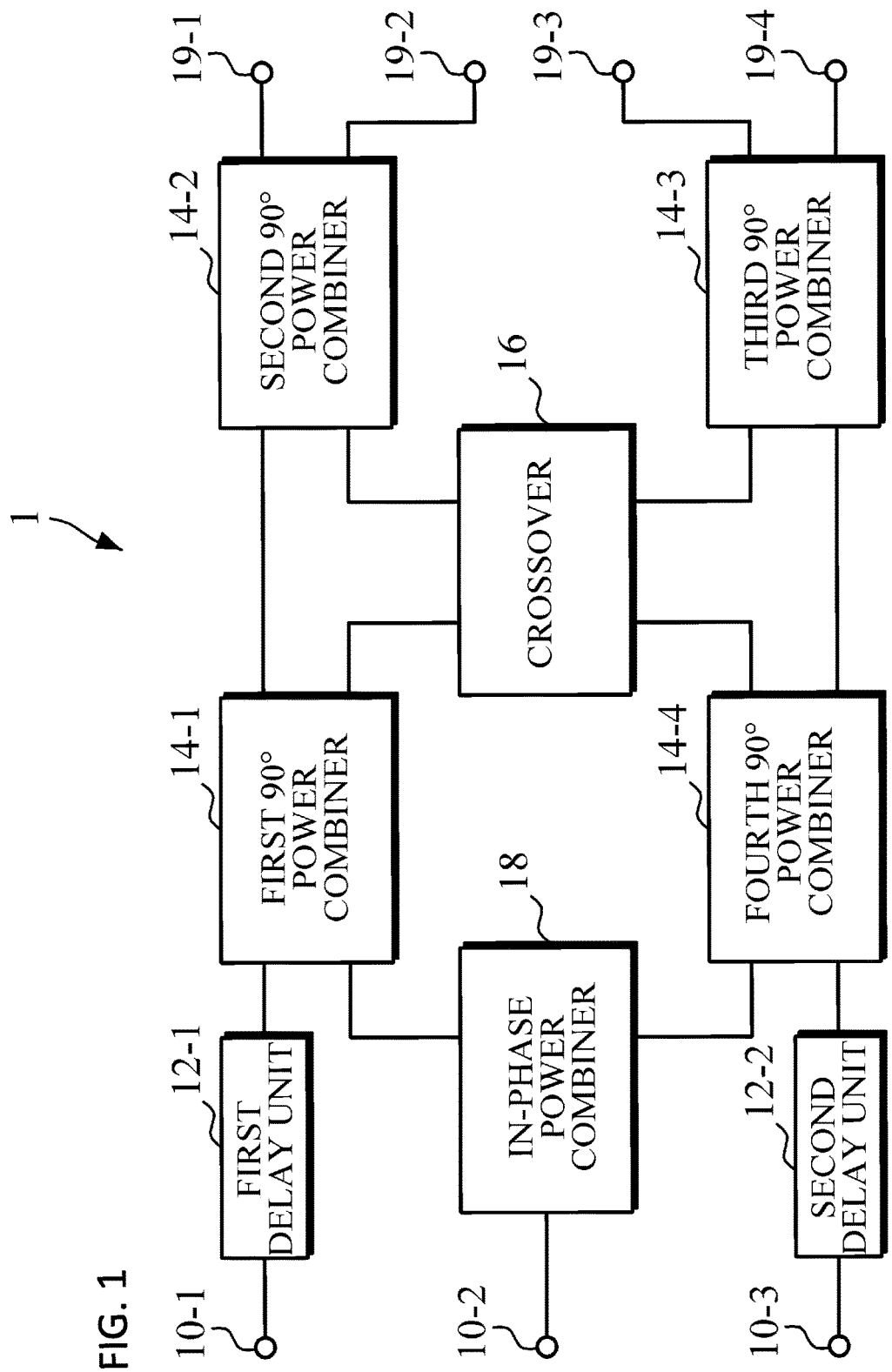
FIG. 1 is a block diagram showing an orbital angular momentum (OAM) mode combining apparatus according to an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

In the following description, when the detailed description of the relevant known functions or configurations is determined to unnecessarily obscure the important point of the present disclosure, the detailed description will be omitted. Also, terms used herein are defined in consideration of the functions of the present disclosure and may be changed depending on a user, the intent of an operator, or a custom. Accordingly, the terms must be defined based on the following overall description of this specification.

Hereinafter, embodiments of the present disclosure will be described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

FIG. 1 is a block diagram showing an orbital angular momentum (OAM) mode combining apparatus according to an embodiment of the present disclosure.

Referring to FIG. 1, an OAM mode combining apparatus 1 includes three input ports 10-1, 10-2, and 10-3, two delay units 12-1 and 12-2, four 90° power combiners 14-1, 14-2, 14-3, and 14-4, a crossover 16, an in-phase power combiner 18, and four output ports 19-1, 19-2, 19-3, and 19-4.

The 90° power combiners 14-1, 14-2, 14-3, and 14-4 may each be a 90° 3 dB power combiner. A power combiner is a combiner having a function of uniformly distributing input power such that two outputs have the same half power in a transmission line.

The OAM mode combining apparatus 1 generates four outputs in response to three inputs by using the in-phase power combiner 18 and the 90° power combiners 14-1, 14-2, 14-3, and 14-4, which are general circuit elements that are widely used. That is, different OAM signals are applied to the three input ports 10-1, 10-2, and 10-3 of the OAM mode combining apparatus 1, phases of signals output through the four output ports 19-1, 19-2, 19-3, and 19-4 may be represented differently depending on the OAM signals input through the each of the input ports 10-1, 10-2, and 10-3. Thus OAM modes are combined or divided at the same time.

In the present disclosure, "mode 0" indicates a mode in which phases in all planes are the same in an electric field propagating direction, "mode +1" indicates a mode in which phases in the same plane have a difference of 360 degrees clockwise with respect to a propagating axis in an electric field propagating direction, and "mode −1" indicates a mode in which phases in the same plane have a difference of 360 degrees counter-clockwise with respect to a propagating axis in an electric field propagating direction.

In a transmission mode, three independent data signals generated from a transmitter are input to three input port 10-1, 10-2, and 10-3. An operation performed when the signals are applied to the input ports 10-1, 10-2, and 10-3 will be described below.

When a first mode signal is applied to the first input port 10-1, the first mode signal is divided into two signals by the first 90° power combiner 14-1 after passing through the first delay unit 12-1 and then is applied to the crossover 16 and the second 90° power combiner 14-2. The signal applied to the crossover 16 is applied to the third 90° power combiner 14-3. The signal applied to the third 90° power combiner 14-3 is output through the two output ports 19-3 and 19-4. The signal applied to the second 90° power combiner 14-2 is output through the two output ports 19-1 and 19-2.

By adjusting the crossover 16 to have an appropriate phase delay, the signals output from the output ports 19-1, 19-2, 19-3, and 19-4 have the same magnitude, and the signals output from the output ports 19-2, 19-3, and 19-4 have different phase delays of 90° (the second output port), −180° (the third output port), and −270° (the fourth output port) with respect to the first output port 19-1, respectively. The first delay unit 12-1 may be a delay line.

When a second mode signal is applied to the second input port 10-2, the second mode signal is divided into two signals after passing through the in-phase power combiner 18. One of the two signals is applied to the first 90° power combiner 14-1. The signal is divided into two signals again and then applied to the crossover 16 and the second 90° power combiner 14-2. The signal applied to the crossover 16 is applied to the third 90° power combiner 14-3. The signal applied to the third 90° power combiner 14-3 is output through the two output ports 19-3 and 19-4. The signal applied to the second 90° power combiner 14-2 is output through the two output ports 19-1 and 19-2.

The other signal generated by the in-phase power combiner 18 is applied to the fourth 90° power combiner 14-4. The signal is divided into two signals again and then applied to the crossover 16 and the third 90° power combiner 14-3. The signal applied to the crossover 16 is applied to the second 90° power combiner 14-2. The signal applied to the second 90° power combiner 14-2 is output through the two output ports 19-1 and 19-2. The signal applied to the third 90° power combiner 14-3 is output through the two output ports 19-3 and 19-4.

By adjusting the crossover 16 to have an appropriate phase delay, the output signals of the output ports may have the same magnitude and the sample phase delay with respect to the first output port 19-1.

When a third mode signal is applied to the third input port 10-3, the third mode signal is divided into two signals after passing through the second delay unit 12-2 and then is applied to the crossover 16 and the third 90° power combiner 14-3. The signal applied to the crossover 16 is applied to the second 90° power combiner 14-2. The signal applied to the second 90° power combiner 14-2 is output through the two output ports 19-1 and 19-2. The signal applied to the third 90° power combiner 14-3 is output through the two output ports 19-3 and 19-4.

By adjusting the crossover 16 to have an appropriate phase delay, the output signals of the output ports may have the same magnitude and different phase delays of 90° (the second output port), 180° (the third output port), and 270° (the fourth output port) with respect to the first output port 19-1.

The delay unit 12-1 and 12-2 are used to compensate for the phase delays generated by the in-phase power combiner 18 and are needed to utilize phase information regarding the input signals. The in-phase power combiner 18 is a three-port network. Two output signals have the same magnitude and the same phase with respect to one input signal. The 90° power combiners 14-1, 14-2, 14-3, and 14-4 are each a four-port network which has one isolated output and two signal outputs with respect to one signal. In this case, the two output signals have the same signal magnitude and a phase difference of 90°. The crossover 16 is a four-port network which has two isolated outputs and one signal output with respect to one input. In this case, signal crossing may be performed in a planar structure without a separate three-dimensional (3D) structure.

Figure 2:
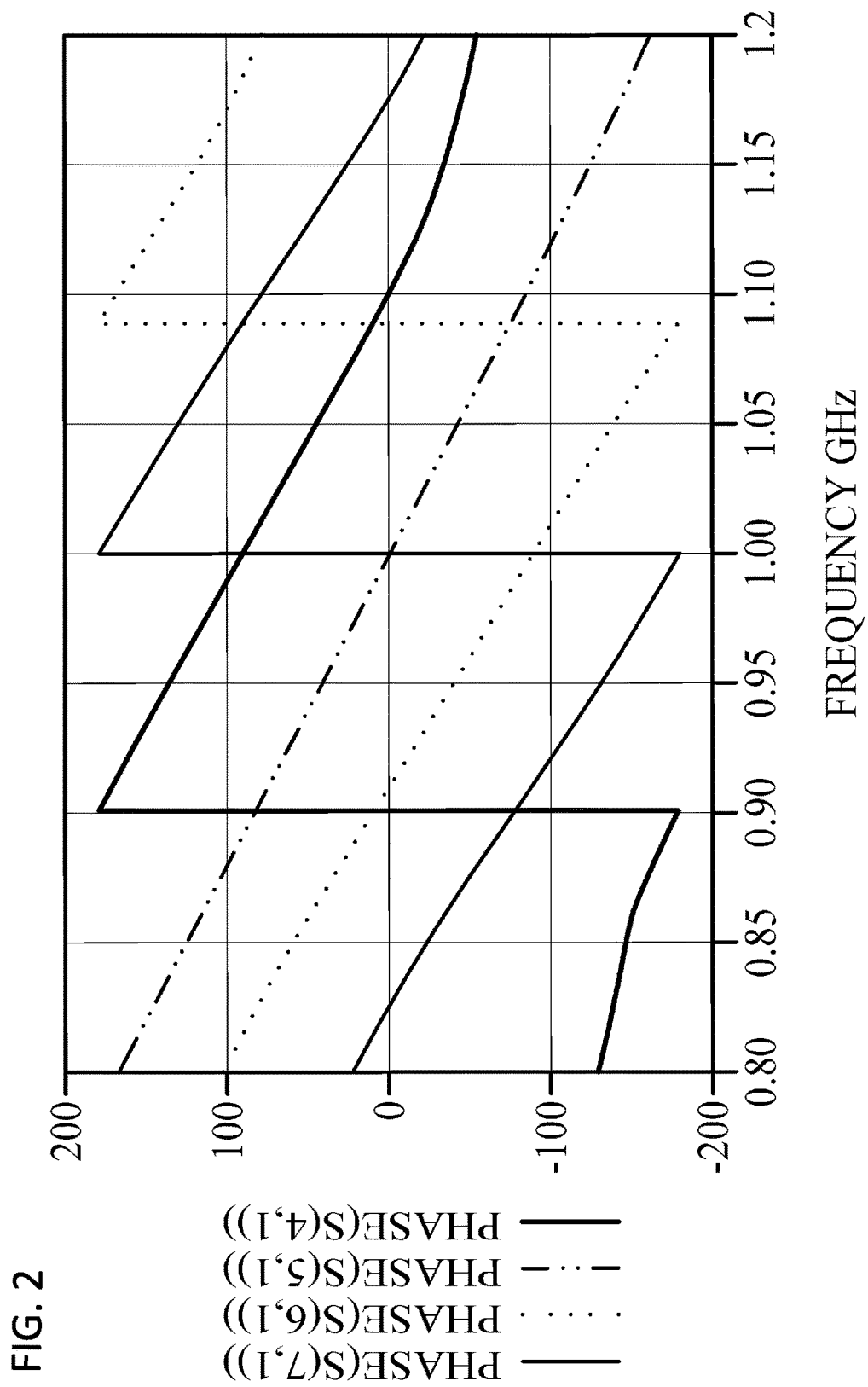
FIG. 2 is a graph showing, as an output characteristic of an OAM mode combiner according to an embodiment of the present disclosure, an output phase difference among output ports when a first mode signal is applied to a first input port.
Figure 3:
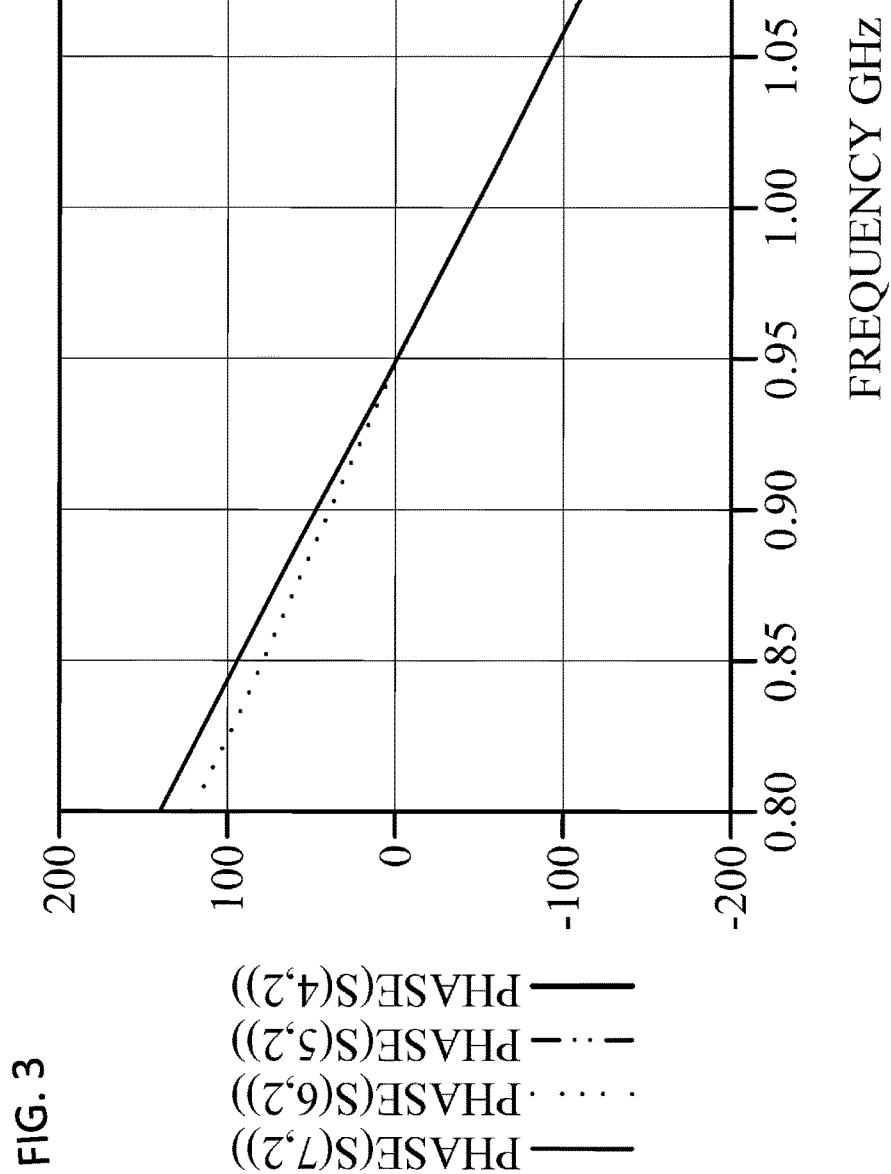
FIG. 3 is a graph showing, as an output characteristic of an OAM mode combiner according to an embodiment of the present disclosure, an output phase difference among output ports when a signal is applied to a second input port.
Figure 4:
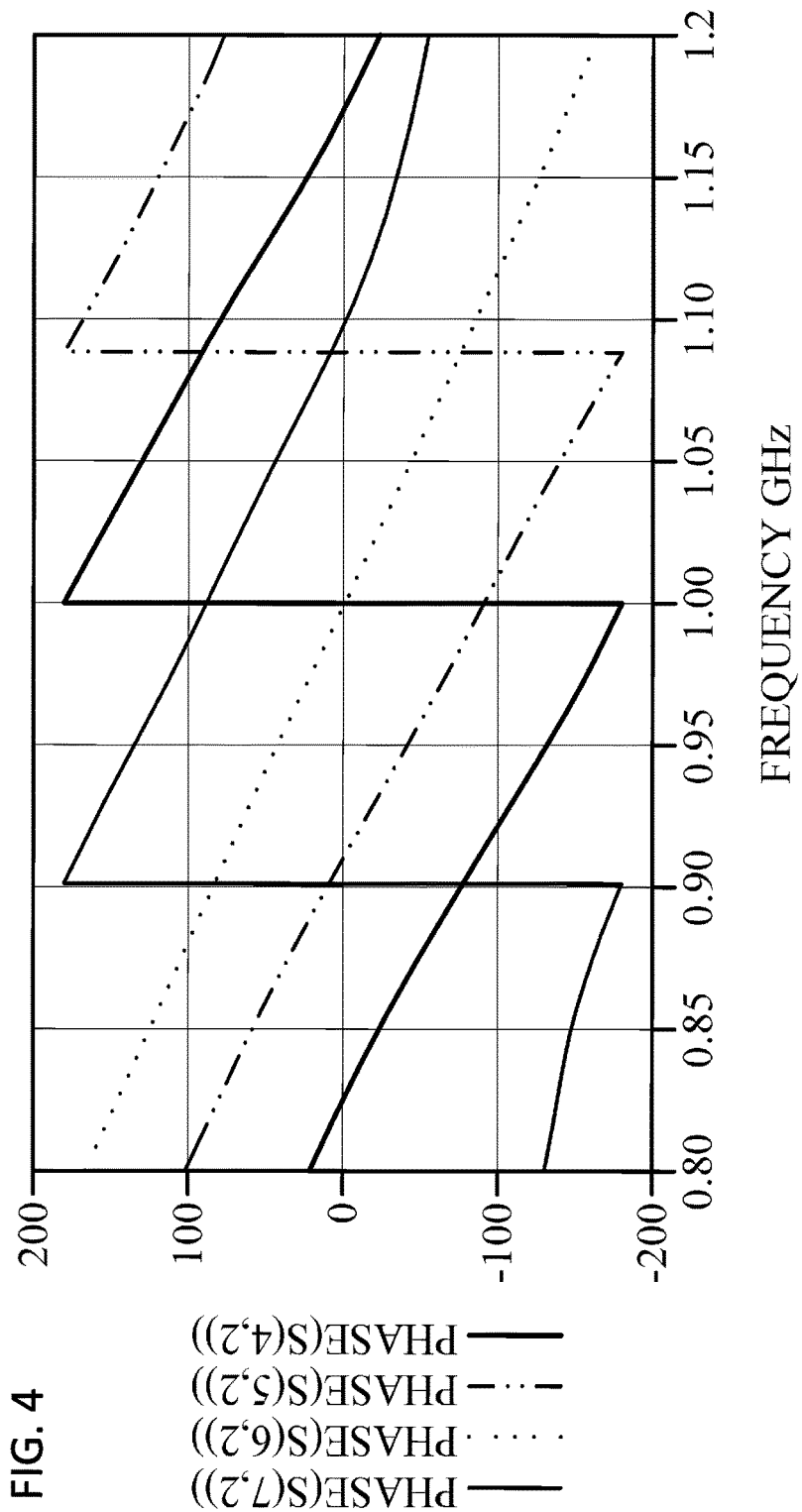
FIG. 4 is a graph showing, as an output characteristic of an OAM mode combiner according to an embodiment of the present disclosure, an output phase difference among output ports when a signal is applied to a third input port.

FIGS. 2, 3, and 4 show phase characteristics of the output ports, which is shown in FIG. 1, of the OAM mode combining apparatus according to an embodiment of the present disclosure.

In detail, FIG. 2 is a graph showing, as an output characteristic of an OAM mode combiner according to an embodiment of the present disclosure, an output phase difference among the output ports 19-1, 19-2, 19-3, and 19-4 when a first mode signal is applied to the first input port 10-1.

Referring to FIGS. 1 and 2, the signals output from the output ports 19-1, 19-2, 19-3, and 19-4 have the same magnitude, and the signals output from the output ports 19-2, 19-3, and 19-4 have different phase delays of 90° (the second output port), −180° (the third output port), and −270° (the fourth output port), respectively.

FIG. 3 is a graph showing, as an output characteristic of an OAM mode combiner according to an embodiment of the present disclosure, an output phase difference among the output ports 19-2, 19-2, 19-3, and 19-4 when a signal is applied to the second input port 10-2.

Referring to FIGS. 1 and 3, the signals output from the output ports 19-1, 19-2, 19-3, and 19-4 have the same magnitude and the same phase delay with respect to the first output port 19-1.

FIG. 4 is a graph showing, as an output characteristic of an OAM mode combiner according to an embodiment of the present disclosure, an output phase difference among the output ports 19-3, 19-2, 19-3, and 19-4 when a signal is applied to the third input port 10-3.

Referring to FIGS. 1 and 4, the signals output from the output ports 19-1, 19-2, 19-3, and 19-4 have the same magnitude and different phase delays of 90° (the second output port), 180° (the third output port), and 270° (the fourth output port) with respect to the first output port 19-1, respectively.

FIG. 5 is a block diagram showing an antenna structure in which a single antenna is disposed at an output port of the OAM mode combining apparatus of FIG. 1 to generate a multi-OAM-mode radiation pattern according to an embodiment of the present disclosure.

Referring to FIGS. 1 and 5, an antenna structure 5 has a single antenna disposed at each of the output ports of the OAM mode combining apparatus. The antenna structure 5 receives, through antenna input ports, signals distributed by the OAM mode combining apparatus and output through the output ports and generates a multi-OAM-mode radiation pattern due to phase delays among the antenna input ports.

In the antenna structure 5, unit antennas 50-1, 50-2, 50-3, and 50-4 are disposed in order to form a single antenna structure for three OAM mode signals. In this case, the unit antennas 50-1, 50-2, 50-3, and 50-4 may be disposed, as shown in FIG. 5, using a planar patch antenna or a horn antenna.

According to an embodiment, when signals having different phases and the same magnitude are applied to antenna input ports 500-1, 500-2, 500-3, and 500-4, a multi-OAM-mode signal is generated due to phase delays among the antenna input ports 500-1, 500-2, 500-3, and 500-4.

For example, when signals with phase delays of 0°, 90°, 180°, and 270° are applied to the first input port 500-1, the second input port 500-2, the third input port 500-3, and the fourth input port 500-4, respectively, a multi-OAM-mode signal with a phase rotating clockwise in an electric field direction is generated.

An another example, when signals with the same phase are applied to the input ports 500-1, 500-2, 500-3, and 500-4, a multi-OAM-mode signal with the same phase in an electric field direction is generated.

As still another example, when signals with phase delays of 0°, 270°, 180°, and 90° are applied to the first input port 500-1, the second input port 500-2, the third input port 500-3, and the fourth input port 500-4, respectively, a multi-OAM-mode signal with a phase rotating counterclockwise in an electric field direction is generated.

By connecting the OAM mode combining apparatus 1 that has been described with reference to FIG. 1 with the antenna structure 5 of FIG. 5, three OAM mode signals may be generated and radiated at the same time using the single antenna structure 5.

According to an embodiment of the present invention, compared to a structure in which an existing planar substrate, a 4×4 Butler matrix, and two crossovers are used, the range of operating frequency is wide, and "mode 0" transmission is possible because only a single crossover is used.

In addition, since multiple OAM modes are combined to allow radiation through one antenna structure, communication is possible even though an antenna is not used for each mode. In this case, when a system is established, the structure is simple, and the cost is reduced. Furthermore, the present invention can be implemented with a single antenna structure, thus providing a communication service that is robust against wind or rain.

So far, the present disclosure has been described with reference to embodiments thereof. It will be understood by those skilled in the art that various changes in form and details may be made therein without departing from the spirit and scope of the present disclosure as defined by the appended claims. Therefore, the disclosed embodiments should be considered in descriptive sense only and not for purposes of limitation. Therefore, the scope of the present disclosure is defined not by the detailed description but by the appended claims, and all differences within the scope will be construed as being included in the present disclosure.

What is claimed is:

1. An apparatus for orbital angular momentum (OAM) mode combination, the apparatus comprising:
   three input ports configured to receive independent OAM mode signals;
   four output ports configured to output OAM mode signals having the same magnitude; and
   a circuit element configured to distribute a first OAM mode signal received through a first input port among the three input ports to the four output ports, a second OAM mode signal received through a second input port among the three input ports to the four output ports, and a third OAM mode signal received through a third input port among the three input ports to the four output ports, and adjust phases of output signals output through the four output ports to be different depending on the OAM mode signals received through the input ports.

2. The apparatus of claim 1, wherein the circuit element comprises:
   an in-phase power combiner having two outputs with respect to one input, the two outputs having the same phase;
   four 90° power combiners each having one isolated output and two signal outputs with respect to one input, the two signal output signals having a phase difference of 90° ; and
   a crossover having two isolated outputs and one signal output with respect to one input.

3. The apparatus of claim 2, wherein,
   the in-phase power combiner is an in-phase 3 dB power combiner, and
   the 90° power combiners are each a 90° 3 dB power combiner.

4. The apparatus of claim 2, wherein the circuit element comprises:
   a first 90° power combiner configured to receive the first OAM mode signal applied to the first input port and divide the first mode signal into two signals;
   a second 90° power combiner configured to receive one of the two signals generated by the first 90° power combiner, divide the received signal into two signals, and output the two signals through first and second output ports; and
   a third 90° power combiner configured to, when the crossover receives the other of the two signals generated by the first 90° power combiner, receive a signal output through the crossover, divide the received signal into two signals, and output the two signals through third and fourth output ports.

5. The apparatus of claim 4, wherein the crossover adjusts a phase delay such that the output signals output through the four output ports have a phase delay of −90° therebetween with respect to the first output port.

6. The apparatus of claim 2, wherein the circuit element comprises:
   an in-phase power combiner configured to receive the second OAM mode signal applied to the second input port and divide the second OAM mode signal into two signals;
   a first 90° power combiner configured to receive one of the two signals generated by the in-phase power combiner and divide the received signal into two signals;
   a second 90° power combiner configured to receive one of the two signals generated by the first 90° power combiner, divide the received signal into two signals, and output the two signals through first and second output ports;

a third 90° power combiner configured to, when the crossover receives the other of the two signals generated by the first 90° power combiner, receive a signal output through the crossover, divide the received signal into two signals, and output the two signals through third and fourth output ports; and a fourth 90° power combiner configured to receive the other of the two signals generated by the in-phase power combiner and divide the received signal into two signals.

7. The apparatus of claim 6, wherein, when the crossover receives one of the two signals generated by the fourth 90° power combiner, the second 90° power combiner receives a signal output through the crossover, divides the received signal into two signals, and outputs the two signals through the first and second output ports.

8. The apparatus of claim 6, wherein the third 90° power combiner receives the other of the two signals generated by the fourth 90° power combiner, divides the received signal into two signals, and outputs the two signals through the third and fourth output ports.

9. The apparatus of claim 6, wherein the crossover adjusts a phase delay such that the output signals output through the four output ports have a phase delay of 0° with respect to the first output port.

10. The apparatus of claim 2, wherein the circuit element comprises:

a fourth 90° power combiner configured to receive the third OAM mode signal applied to the third input port and divide the third OAM mode signal into two signals;

a third 90° power combiner configured to receive one of the two signals generated by the fourth 90° power combiner, divide the received signal into two signals, and output the two signals through third and fourth output ports; and a second 90° power combiner configured to, when the crossover receives the other of the two signals generated by the fourth 90° power combiner, receive a signal output through the crossover, divide the received signal into two signals, and output the two signals through first and second output ports.

11. The apparatus of claim 10, wherein the crossover adjusts a phase delay such that the output signals output through the four output ports have a phase delay of 90° therebetween with respect to the first output port.

12. The apparatus of claim 1, further comprising:

an antenna apparatus comprising an antenna structure having a single antenna disposed at each of the output port, wherein the antenna structure is configured to receive, through antenna input ports, the OAM mode signals distributed by the OAM mode combining apparatus, and output through the four output ports and generate a multi-OAM-mode radiation due to the phase delays among the antenna input ports.

13. The antenna apparatus of claim 12, wherein, when the received OAM mode signals with phase delays of 0°, 90°, 180°, and 270° are applied to a first antenna input port, a second antenna input port, a third antenna input port, and a fourth antenna input port, the antenna structure generates a multi-OAM-mode signal with a phase rotating clockwise in an electric field direction.

14. The antenna apparatus of claim 12, wherein, when the received OAM mode signals with the same phase are applied to the antenna input ports, the antenna structure generates a multi-OAM-mode signal with the same phase in an electric field direction.

15. The antenna apparatus of claim 12, wherein, when the received OAM mode signals with phase delays of 0°, 270°, 180°, and 90° are applied to a first antenna input port, a second antenna input port, a third antenna input port, and a fourth antenna input port, the antenna structure generates a multi-OAM-mode signal with a phase rotating counterclockwise in an electric field direction.

16. The antenna apparatus of claim 12, wherein the antenna structure is a planar patch antenna.

17. The antenna apparatus of claim 12, wherein the antenna structure is a horn antenna.

* * * * *